Oct. 6, 1970 J. E. BAYHA 3,532,818
FACSIMILE APPARATUS WITH THE RECEIVING DRUM DRIVEN AT A HIGHER SPEED THAN THE TRANSMITTING DRUM
Filed June 5, 1967
2 Sheets-Sheet 1

INVENTOR.
JACK E. BAYHA
BY
Oldham & Oldham
ATTORNEYS

Oct. 6, 1970 J. E. BAYHA 3,532,818
FACSIMILE APPARATUS WITH THE RECEIVING DRUM DRIVEN AT A HIGHER SPEED THAN THE TRANSMITTING DRUM
Filed June 5, 1967
2 Sheets-Sheet 2

INVENTOR.
JACK E. BAYHA
BY
Oldham & Oldham
ATTORNEYS.

United States Patent Office 3,532,818
Patented Oct. 6, 1970

3,532,818
FACSIMILE APPARATUS WITH RECEIVING DRUM DRIVEN AT A HIGHER SPEED THAN THE TRANSMITTING DRUM

Jack E. Bayha, 11753 Sperry Road, Chesterland, Ohio 44026

Filed June 5, 1967, Ser. No. 643,513
Int. Cl. H04l 7/10
U.S. Cl. 178—69.5 5 Claims

ABSTRACT OF THE DISCLOSURE

A transmission device for a picture or printed matter which utilizes an Edison Phonograph scanning method in combination with a photocell pickup to transmit information to a displaced recorder. Essentially, one drum is rotated in synchronism with a displaced second drum. Information normally recorded as writing, printing, or pictures on paper is positioned on the surface of a first drum and sequentially scanned over its entire surface by a light and recorded by a photocell which sends the signal to a second drum. The second drum has a sensitive paper or other suitable material on the surface thereof, and an appropriate recording instrument driven by the signal marks the paper to reproduce the information positioned on the surface of the first drum. The details of the synchronization are achieved by rotating the second drum at a slightly greater speed than the first and stopping it momentarily on each revolution and starting it on the next revolution at a predetermined point in the continuous revolution of the first drum. In this manner, the second drum is synchronized to the revolution of the first drum once during each revolution thereof.

The ability to transmit a picture or printing by means of wires or by propagated waves is well known by today's communications technology. However, this invention comprises a unique and extremely simple low cost device for performing this function. Its design is so simple, and yet reliable, as to make the entering of many new fields for the technique, such as toys, and hotel and motel message service, a definite possibility.

The general object of the invention, but in no way intended to be a limitation to the scope of the invention, is the design of a toy picture transmission system from a transmitter to a receiver when such components are electrically coupled by wires, or by use of known walkie talkie or short wave radio signals.

For a better understanding of the invention reference should be had to the drawings wherein.

The invention starts with recorded information such as a picture, or drawing, or lettering normally printed onto paper or some other flexible surface, and easy to handle, which in the embodiment to be described is attached to a drum and rotated in a special manner, as more fully defined hereinafter. The picture or recorded information is illuminated by a small spot of light which will progress from one end of the drum to the other, as the drum is rotated, thus in effect scanning the picture in a manner similar to wirephoto and similar systems, or as perhaps may be more widely understood as the Edison Phonograph scanning method. The light is monitored by a photo sensitive device placed in close proximity to the light spot, and which reacts to changing light levels by either delivering or not delivering an electrical signal or by changing its electrical resistance.

Figure 1:
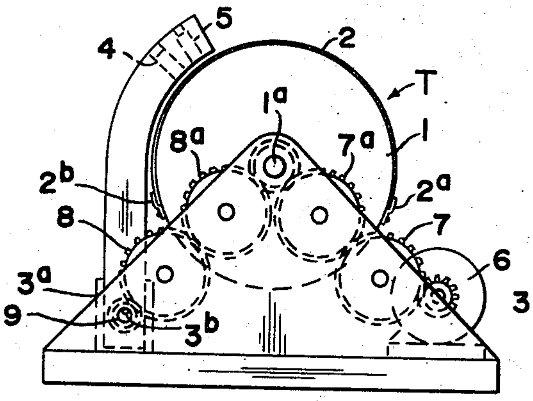
FIG. 1 is an end elevational view of the preferred embodiment of the transmitting drum of the invention.
Figure 2:
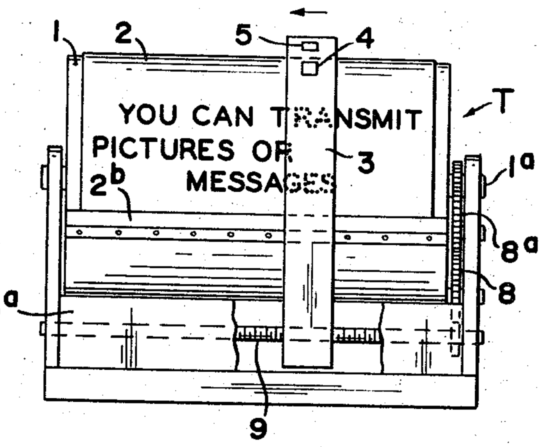
FIG. 2 is a front elevational view of the drum of FIG. 1.

A transmitter, indicated generally by letter T, is shown in FIG. 1. A first drum 1 has a sheet 2 of recorded data or information attached to it which in this case is a printed message as seen in FIG. 2. Spring clips 2*a* and 2*b* are used to clamp the end of the picture 2 onto the drum 1. An arm 3 carries a lamp 4 and photoelectric device, or cell 5, both of which are positioned in close proximity to the surface of the picture 2 so as to obtain a high resolution pickup. A motor 6 turns appropriate gears 7 and 7*a*, 8 and 8*a* so as to cause the lead screw 9 for example to turn one revolution when drum 1 makes one complete revolution. Gear 7*a* engages an appropriate geared shaft 1*a* directly coupled to drum 1. Lead screw 9 as an example might be provided with a thread of 64 per inch, so that as drum 1 rotates one revolution, arm 3 which is threadably received on screw 9 is guided in track 3*a* and advanced across the paper in the direction of the solid arrow in FIG. 2 a distance of $1/64$ of an inch.

Referring to FIG. 2, this shows how arm 3 travels down lead screw 9, by virtue of mating threads. Reversing the direction of rotation of the motor 6 allows the arm to be returned as desired to the end of the drum to scan another picture, or the screw 9 could be split type as indicated at 3*b* in FIG. 1 and merely opened to effect a manual return traverse of arm 3.

This system of scanning in effect uses techniques and apparatus which are well known for other purposes, and its use in this specification is merely to describe the preferred embodiment of the invention. However, it should be understood that other scanning or reading techniques in transmission and/or recording are contemplated to fall within the scope of the invention.

Figure 3:
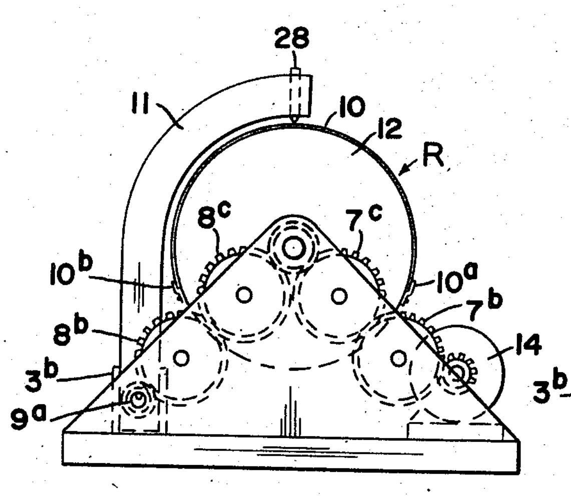
FIG. 3 is an end elevational view of the receiving drum of the invention.
Figure 4:
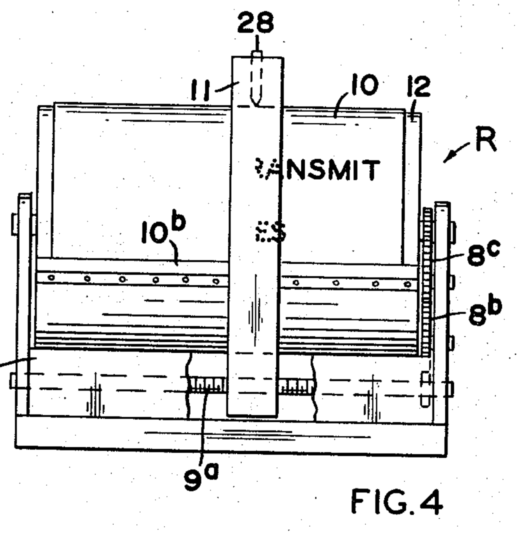
FIG. 4 is a front elevational view of the drum of FIG. 3.

The receiver, indicated generally by letter R, is in large part a mechanical duplication of the transmitter shown in FIG. 1. It is illustrated in FIG. 3. The recording paper or other suitable recording material, to be defined more fully hereinafter, is indicated generally by numeral 10, and can be clamped in place by spring clips 10*a* and 10*b* onto drum 12. The drum 12 is rotatably driven by a suitable motor 14 acting through gears 7*b* and 7*c*. The paper 10 can be any of a number of materials. The specific material which is used will govern what recording apparatus is provided in an arm 11 of the receiver R. The arm 11 is moved across the drum 12 by a screw 9*a* rotatably driven by gears 8*b* and 8*c*, and guided relative thereto by track 3*b*. Subtantially the same moving relation of arm 11 with drum 12 as arm 3 with drum 1 is desirable to meet the objects of the invention.

For example, a paper manufactured by 3–M Company called "Action Paper," requires a solenoid operated stylus 28 be employed as any pressure, even when very light, leaves a mark on this paper and the marks vary depending on the amount of pressure applied. Therefor, a rather dull, but pointed stylus 28 driven with electrical energy controlled by cell 5 will faithfully reproduce in light and dark on the paper 10 the light and dark seen by cell 5.

Another example would be to use a material known as

"Alfax Type A," as made by the Alfax Manufacturing Co., a paper which turns a brownish-color when even small amounts of electrical current are passed through it. In this case drum 12 would be made of a conductive material and the current passed or not passed by the cell 5 would be connected through an electrically conductive stylus and color the paper as desired, in faithful relationship to the light seen off picture 2 as reflected from lamp 4.

In yet another embodiment, a pen writing device, preferably a reliable ball point pen, could be solenoid controlled by the cell 5, and mark on even plain paper carried by drum 12.

There are numerous techniques of making a legible coloration at the receiver end, and the above examples are given to indicate that the invention need not be tied to any single or plurality of writing techniques.

As known to the art, such a system as that set forth above for the transmitter T and receiver R is fully capable of detecting and reproducing a picture, either by wires, or radio frequency propagation after proper detection. Such systems rely, however, on the ability to keep the two drums in synchronism, or rotational alignment during scanning and recording. In the past this synchronism has required the use of either expensive synchronous motors, or an elaborate synchronizing system. The instant invention relates to a method of keeping these drums in sufficient synchronism to make an acceptable picture transmission and reproduction, and further being able to do so even with the most inexpensive toy motors, as designed for battery use, or the simplest of alternating current induction motors of the smallest types. The ability to maintain adequate synchronism with battery powered motors makes this device capable of being manufactured at a low enough price so as to be sold in the scientific toy market.

Figure 5:
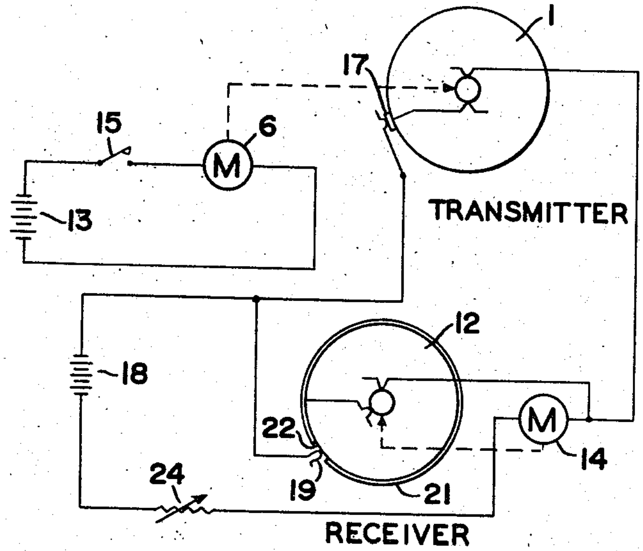
FIG. 5 is a schematic electrical diagram of the synchronization circuit between the two drums.

FIG. 5 shows the basic electrical schematic to achieve synchronization for the preferred embodiment of the drum type configuration detailed, but is in no way intended to confine the invention to said configuration. A first battery or power supply 13 or other power supply supplies power to transmitter motor 6 whenever switch 15 is closed. Switch 15 is closed manually by the operator. This makes drum 1 revolve. When it revolves, it will cause contact 17 to close, which will cause receiver motor 14 to revolve, as power from a second battery or power supply 18 or other suitable power supply is connected to the circuit. As drum 1 revolves, it will stop supplying power to motor 14 through contact 17, but drum 12 having begun to revolve will be supplying power to itself through contacts 19 and 21, and thus will revolve until it reaches a dead area 22, at which point motor 14 will be shut off as power is no longer supplied to it.

The entire technique of syncronism is then achieved since when drum 12 stops, it will start again at the precise time when contact 17 closes upon the rotation of drum 1. The contact 17 is short, preferably much less than one-half of the circumference whereas, contact 19 is very long, preferably much greater than one half of the circumference. Thus a complete synchronism between both drums is reestablished at every revolution of the drum 1. The drum 1 may be of slightly larger diameter than drum 12 if the drums are driven in rotation by motors of substantially the same speed and engaging the periphery of the respective drums. However, the diameter relationship between the drums is unimportant if the receiving drum is driven at an r.p.m. slightly faster than the transmitting drum. In any event, synchronization is achieved by providing the momentary dead spot or area in the rotation of the receiving drum on each revolution as it hits dead area 22 until its drive is picked up again by the rotation of drum 1 closing contact 17. A rheostat control 24 is used in a function analogous to a width control in a television set, and controls the aspect rato of the picture, or its width, and allows for individual operator control of the received picture, a feature in the toy market. In markets other than the toy market, the use of battery powered motors as manufactured by the Japanese firm Mabuchi, for tape recorders, and equipped with regulators, renders the need of control 24 unnecessary. The photocell should be quite sensitive to ordinary light. A typical cell would be a cadmium sulfide device as made by Vagtec Corp., of Marylyn Heights, Missouri. The invention contemplates that substantially all parts of both drums, the gears, and arms, can be made from molded plastic.

Figure 6:
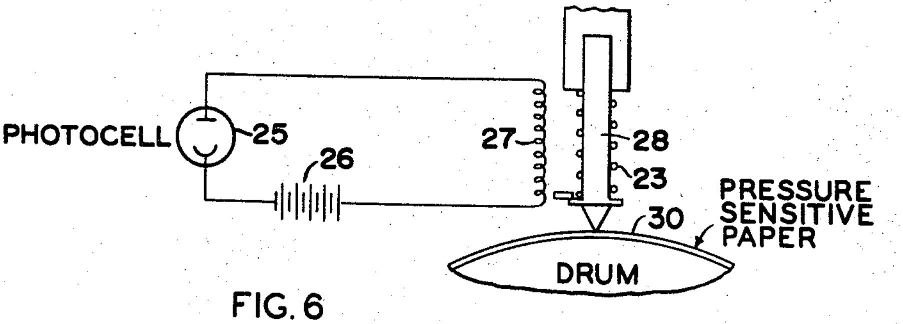
FIG. 6 is a schematic electrical diagram of one embodiment of the scribing apparatus associated with the receiving drum.

By way of explanation of the writing techniques to be used, FIG. 6 shows, for example, one in which a cell 25, powered by a battery 26, causes selenoid 27 to pull up pen or stylus 28, which is normally held in contact with 3–M paper 30, by spring 23, when the cell 25 sees light.

Figure 7:
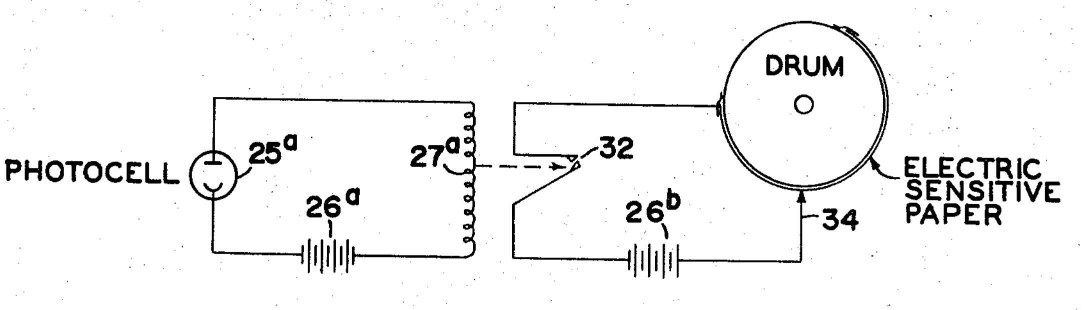
FIG. 7 is a schematic electrical diagram of another embodiment of the scribing apparatus associated with the receiving drum.

FIG. 7 shows a system whereby a relay 32 is in the normally closed position, and causes the Alfax paper to be marked by the passage of electric current through a stylus 34 to the electrically conductive surface of the drum whenever the cell is not illuminated.

Figure 8:
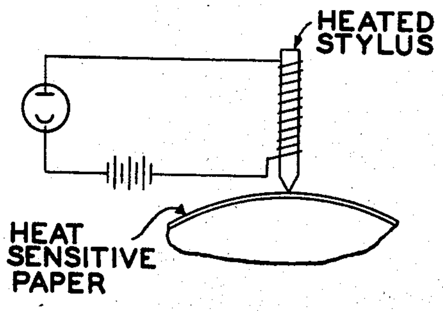
FIGS. 8 and 9 are schematic electrical diagrams of other embodiments of writing apparatus that meet the objects of the invention.
Figure 9:
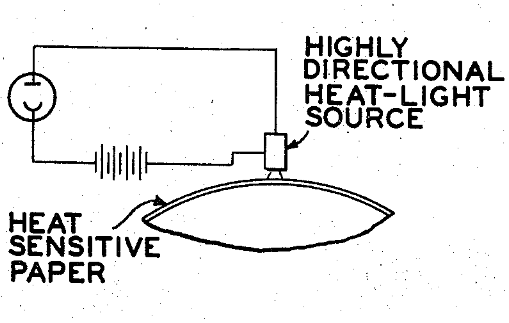

FIGS. 8 and 9 show embodiments wherein a heat sensitive paper, such as "Thermo-Fax" as made by the 3–M Company used with either a heated stylus or a highly directional heat-light source being controlled by the light seen by the photocell.

When the fundamental ability to rotate the two drums, or other scanning devices, in synchronism once for every rotation of the transmitting drum is achieved, it is easy to sequentially scan and to provide transmission and reception of the scanned information in phase to achieve a facsimile of the original recorded data or information. Hence, actual choice of techniques of scanning, scan rate, transmission and of writing at the receiving station are open to the designer.

Naturally, all of the circuitry shown will work directly from an alternating current input at the receiving station, with the use of rectifiers, and with the substitution of AC motors, the same as with batteries, and it is my intention that my design be so covered as to make the obvious applications of this invention within the scope of the appended claims.

It also should be understood that it would be quite possible to reverse the sending and receiving stations using the same type of synchronization. Hence, in some instances the respective arms might contain both a sending head including the light source and photocell, and a receiving head incorporating some type of stylus, with the ability to quickly change from sending to receiving, and visa versa. Further, while the schematic of FIG. 5 shows the drums connected electrically by direct wires, the same same could be accomplished with a radio transmission circuit, and in fact, in the toy embodiment of the invention a voice transmission circuit, either wired or wireless, could be incorporated into each drum unit to give even greater appeal to the youngsters.

While in accordance with the patent statutes only one best known embodiment of the invention has been illustrated and described in detail, it is to be particularly understood that the invention is not limited thereto or thereby, but that the inventive scope is defined in the appended claims.

What is claimed is:

1. A recorded data transmission device which comprises a first drum mounted for rotation about its longitudinal axis, means to continuously rotate the drum at a substantially constant speed, a second drum mounted for rotation about its longitudinal axis, means to rotate the drum at a substantially constant speed, means to place recorded data onto the outer peripheral surface of one drum which acts as a transmitter drum, means to scan the data with a light source during the rotation of said first drum to measure the intensity of the light during the scanning with respect to the data and produce an electrial signal thereof, means to receive printed information on the outer peripheral surface of the second drum, means actuated and driven by the electrical signal to operatively mark the means to receive printed information, which is characterized by an elongated contact extending around substantially the full circumference of the second drum to energize the means to rotate the second drum, a power source, a first fixed connection from the power source in sliding operative relation with the elongated contact, a short electrical contact mounted to the first drum, a second fixed connection from the power source in sliding operative relation with the short contact throughout only a short arcuate portion of the rotation of the first drum, electrical circuit means interconnecting the contacts so that when the second fixed connection is in contact with the short contact the means to rotate the second drum is energized, with the time period of this energization being enough to drive the first fixed connection back into sliding engagement with the elongated contact on the circumference of the second drum.

2. A device according claim 1 where the elongated contact is mounted concentrically around the outer periphery of the second drum and the short contact is mounted concentrically around the outer periphery of the first drum with both said contacts being electrically connected through the mounting axes of their respective drums.

3. A device according to claim 1 where the means to rotate the second drum effects rotation thereof at a substantially constant speed slightly greater than the speed of rotation of the first drum.

4. A device according to claim 1 where the electrical signal is transmitted to the means actuated and driven by the electrical signal by electromagnetic radiation.

5. A recorded data transmission device which comprises two substantially cylindrically shaped drums, means to place a recording sheet or recorded data on the outer peripheral surface of either drum, means to rotatably drive both drums at the same time, but at slightly different surface speeds, means to scan the surface of one drum during the rotation thereof while recording on the surface of the other drum during the rotation thereof, which is characterized by a separate actuator surface on each drum with the surface on the slower drum being less than half its total circumference and the surface on the faster rotating drum being more than half its total circumference, a separate switch actuator mounted in fixed position to follow the respective surface on each drum during the rotation thereof, the switch actuator following the surface on the faster rotating drum directly causing energization of the means to rotate the drum so long as said surface is contacted, said switch actuator associated with the slower rotating drum directly actuating the means to rotatably drive the faster rotating drum during its period of contact with its respective actuator surface and this contact being for a period of time sufficient to cause the switch actuator for the faster rotating drum to reengage its respective actuator surface to again effect direct energization of the means to rotatably drive the faster rotating drum.

References Cited

UNITED STATES PATENTS

| | | | |
|---|---|---|---|
| 2,108,983 | 2/1938 | Finch | 178—69.5 |
| 3,426,148 | 2/1969 | Shimabukuro | 178—69.5 |

ROBERT L. GRIFFIN, Primary Examiner

D. E. STOUT, Assistant Examiner